(12) United States Patent
Koiso et al.

(10) Patent No.: US 10,257,435 B2
(45) Date of Patent: Apr. 9, 2019

(54) ELECTRONIC DEVICE, IMAGE DATA PROCESSING METHOD, STORAGE MEDIUM AND IMAGING SYSTEM

(71) Applicant: CASIO COMPUTER CO., LTD., Shibuya-ku, Tokyo (JP)

(72) Inventors: Takuya Koiso, Hamura (JP); Tomohiko Murakami, Musashino (JP); Tsuyoshi Horiguchi, Ome (JP); Hiroshi Suzuki, Akiruno (JP); Muneyuki Ishihara, Chofu (JP); Takehito Morimatsu, Fussa (JP); Ken Fujita, Mitaka (JP); Toshihiro Kiuchi, Hachioji (JP); Naoya Okamoto, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/692,897

(22) Filed: Aug. 31, 2017

(65) Prior Publication Data

US 2018/0063448 A1    Mar. 1, 2018

(30) Foreign Application Priority Data

Sep. 1, 2016 (JP) .................................. 2016-170934

(51) Int. Cl.
*H04N 5/262* (2006.01)
*H04N 5/232* (2006.01)
(Continued)

(52) U.S. Cl.
CPC .......... *H04N 5/2624* (2013.01); *H04N 5/217* (2013.01); *H04N 5/2258* (2013.01);
(Continued)

(58) Field of Classification Search
CPC .. H04N 5/2624; H04N 5/23206; H04N 5/217; H04N 5/77; H04N 5/2258; H04N 5/23203; H04N 5/247; H04N 5/23293; H04N 5/907; H04N 1/32765; H04N 7/185; H04N 1/00411; H04N 7/144; G08B 13/19684
See application file for complete search history.

(56) References Cited

U.S. PATENT DOCUMENTS

| | | | |
|---|---|---|---|
| 2005/0111701 A1* | 5/2005 | Seki ................. | G08B 13/19645 382/107 |
| 2007/0250883 A1* | 10/2007 | Busch .............. | G08B 13/19669 725/105 |
| 2014/0132758 A1* | 5/2014 | Saptharishi ............. | H04N 7/18 348/135 |

FOREIGN PATENT DOCUMENTS

JP          2000125287 A      4/2000

\* cited by examiner

*Primary Examiner* — Shahbaz Nazrul
(74) *Attorney, Agent, or Firm* — Holtz, Holtz & Volek PC

(57) ABSTRACT

A receiver sets a storage capacity to be assigned for each connected digital camera based on the number of connected digital cameras, and allocates these storage capacities in a buffer. Also, the receiver sends a request for a through image for each frame to each of the connected digital cameras, receives through images transmitted in response to the requests, and stores the through images in areas of the buffer assigned for each of the digital cameras. Furthermore, after receiving the through image for one frame from each digital camera, the receiver performs image processing on each through image and causes these images to be displayed in a list form on one screen of the display section.

7 Claims, 6 Drawing Sheets

(51) Int. Cl.
  *H04N 5/217* (2011.01)
  *H04N 5/77* (2006.01)
  *H04N 5/225* (2006.01)
  *H04N 5/247* (2006.01)
  *H04N 5/907* (2006.01)
  *H04N 1/327* (2006.01)
(52) U.S. Cl.
  CPC ..... *H04N 5/23203* (2013.01); *H04N 5/23206* (2013.01); *H04N 5/23293* (2013.01); *H04N 5/247* (2013.01); *H04N 5/77* (2013.01); *H04N 5/907* (2013.01); *H04N 1/32765* (2013.01)

FIG. 3

| STAGE | FRAME RATE (fps) | THROUGHPUT (bps) |
|---|---|---|
| 1 | 6 | 610k |
| 2 | 10 | 1040k |
| 3 | 13 | 1400k |
| 4 | 15 | 1500k |
| 5 | 15 | 1500k |
| 6 | 15 | 1500k |
| 7 | 15 | 1500k |
| ⋮ | ⋮ | ⋮ |

FIG. 4

| NUMBER OF CONNECTED CAMERAS | NUMBER OF STAGES (PER CAMERA) | TOTAL |
| --- | --- | --- |
| 1 | 4 | 4 |
| 2 | 4 | 8 |
| 3 | 3 | 9 |
| 4 | 2 | 8 |
| 5 | 2 | 10 |
| 6 | 1 | 6 |
| 7 | 1 | 7 | ved
ELECTRONIC DEVICE, IMAGE DATA PROCESSING METHOD, STORAGE MEDIUM AND IMAGING SYSTEM

CROSS-REFERENCE TO RELATED APPLICATION

This application is based upon and claims the benefit of priority from the prior Japanese Patent Application No. 2016-170934, filed Sep. 1, 2016, the entire contents of which are incorporated herein by reference.

BACKGROUND OF THE INVENTION

1. Field of the Invention

The present invention relates to an electronic device, an image data storing method, a storage medium and an imaging system.

2. Description of the Related Art

Conventionally, a technique (multi-live view) has been known in which a plurality of cameras and an electronic device are connected together and live view images from the plurality of cameras are displayed in a list form on the electronic device.

More specifically, a technique has been proposed in which, when images captured by a plurality of cameras are to be displayed on one screen, image processing memories (FIFO) prepared based on the number of split areas of the screen are used to buffer the captured images, whereby the amount of memory required to display the captured images on one screen can be reduced, as described in Japanese Patent Application Laid-Open (Kokai) Publication No. 2000-125287.

SUMMARY OF THE INVENTION

In accordance with one aspect of the present invention, there is provided an electronic device comprising: a communication section which communicates with a plurality of image transmitting devices; a reception section which receives image data transmitted from the plurality of image transmitting devices by the communication section; a storage section; a setting section which sets as many areas as the plurality of image transmitting devices in the storage section; and a storage control section which controls the storage section such that the image data from the plurality of image transmitting devices are assigned to and stored in each of the respective areas set by the setting section.

In accordance with another aspect of the present invention, there is provided an image data processing method comprising: a communication establishing step of establishing communication with a plurality of image transmitting devices; a receiving step of receiving image data transmitted from the plurality of image transmitting devices in the communication establishing step; a setting step of setting as many areas as the plurality of image transmitting devices, in a storage section; and a storage control step of controlling the storage section such that the image data from the plurality of image transmitting devices are assigned to and stored in each of the respective areas set in the setting step.

In accordance with another aspect of the present invention, there is provided a non-transitory computer-readable storage medium having a program stored thereon that is executable by a computer in an electronic device having a communication section and a storage section to actualize functions comprising: reception processing for receiving image data transmitted from a plurality of external image transmitting devices via communication by the communication section; setting processing for setting as many areas as the plurality of external image transmitting devices, in the storage section; and storage control processing for controlling the storage section such that the image data from the plurality of external image transmitting devices are assigned to and stored in each of the respective areas set by the setting processing.

In accordance with another aspect of the present invention, there is provided an imaging system comprising; a plurality of image transmitting devices, and an electronic device, wherein the electronic device comprises: a communication section which communicates with the plurality of image transmitting devices, a reception section which receives image data transmitted from the plurality of image transmitting devices by the communication section, a storage section, a setting section which sets as many areas as the plurality of image transmitting devices, in the storage section, and a storage control section which controls the storage section such that the image data from the plurality of image transmitting devices are assigned to and stored in each of the respective areas set by the setting section, and wherein each of the plurality of image transmitting devices comprises: an image acquisition section, and a transmission section which continually transmits image data acquired by the image acquisition section to the electronic device.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a conceptual diagram of processable frame rates and throughputs with respect to the number of buffer stages to be assigned for each digital camera 30-i;

FIG. 4 is a conceptual diagram of the number of buffer stages (per camera) to be allocated in accordance with the number of cameras connected to the receiver 10 according to the present embodiment;

DETAILED DESCRIPTION OF THE PREFERRED EMBODIMENT

An embodiment of the present invention will hereinafter be described with reference to the drawings.

A. Structure of Embodiment

Figure 1:
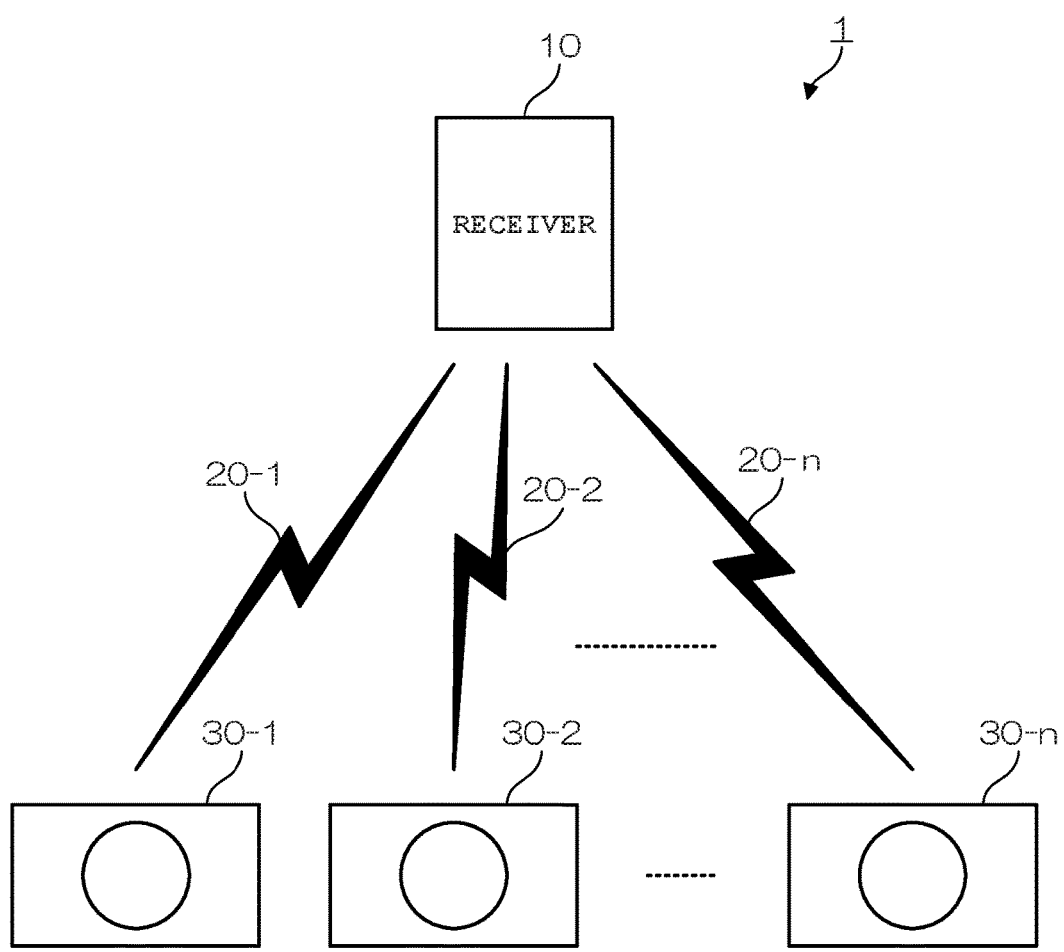
FIG. 1 is a block diagram of the structure of an imaging system 1 using a receiver 10 and a plurality of digital cameras 30-1 to 30-n according to an embodiment of the present invention.

FIG. 1 is a block diagram of the structure of an imaging system 1 using a receiver 10 and a plurality of digital cameras 30-1 to 30-*n* according to an embodiment of the present invention. The receiver 10 in FIG. 1 is constituted by, for example, a smartphone, a tablet terminal, or a dedicated terminal. This receiver 10 includes devices and programs for performing wireless communications (for example, Bluetooth (registered trademark)) 20-1 to 20-*n* with the plurality of digital cameras 30-1 to 30-*n*. Note that the present embodiment is described using a case where seven digital cameras 30-1 to 30-7 (n=7) are connected at maximum.

Each of these digital cameras 30-1 to 30-*n* has, as basic functions, an imaging function (image acquiring function), a function of storing captured image data, and a function of transmitting image data to another digital camera or the receiver 10. Other functions regarding optical performance (such as lens aperture and F value), imaging performance (such as resolution and sensor size), storage capacity, and the like may or may not be provided as long as they have the above-described basic functions.

In addition to the above-described functions regarding image capturing, the plurality of digital cameras 30-1 to 30-*n* include devices and programs for performing the wireless communications 20-1 to 20-*n* with the receiver 10. These digital cameras 30-1 to 30-*n* continually transmit live view images to the receiver 10 via the wireless communications 20-1 to 20-*n* at predetermined frame rates.

By executing a dedicated program or application, the receiver 10 establishes communications with the digital cameras 30-1 to 30-*n* via the wireless communications 20-1 to 20-*n*. Then, the receiver 10 receives image data from the plurality of digital cameras 30-1 to 30-*n* at predetermined timing, stores the image data in areas having storage capacities assigned based on the number of the connected digital cameras, performs image processing on the image data, and displays a list of the images on one screen of a display section of the receiver 10 (multi-live view). Details of the image data receiving method and the storage capacity assigning method herein will be described later.

Figure 2:
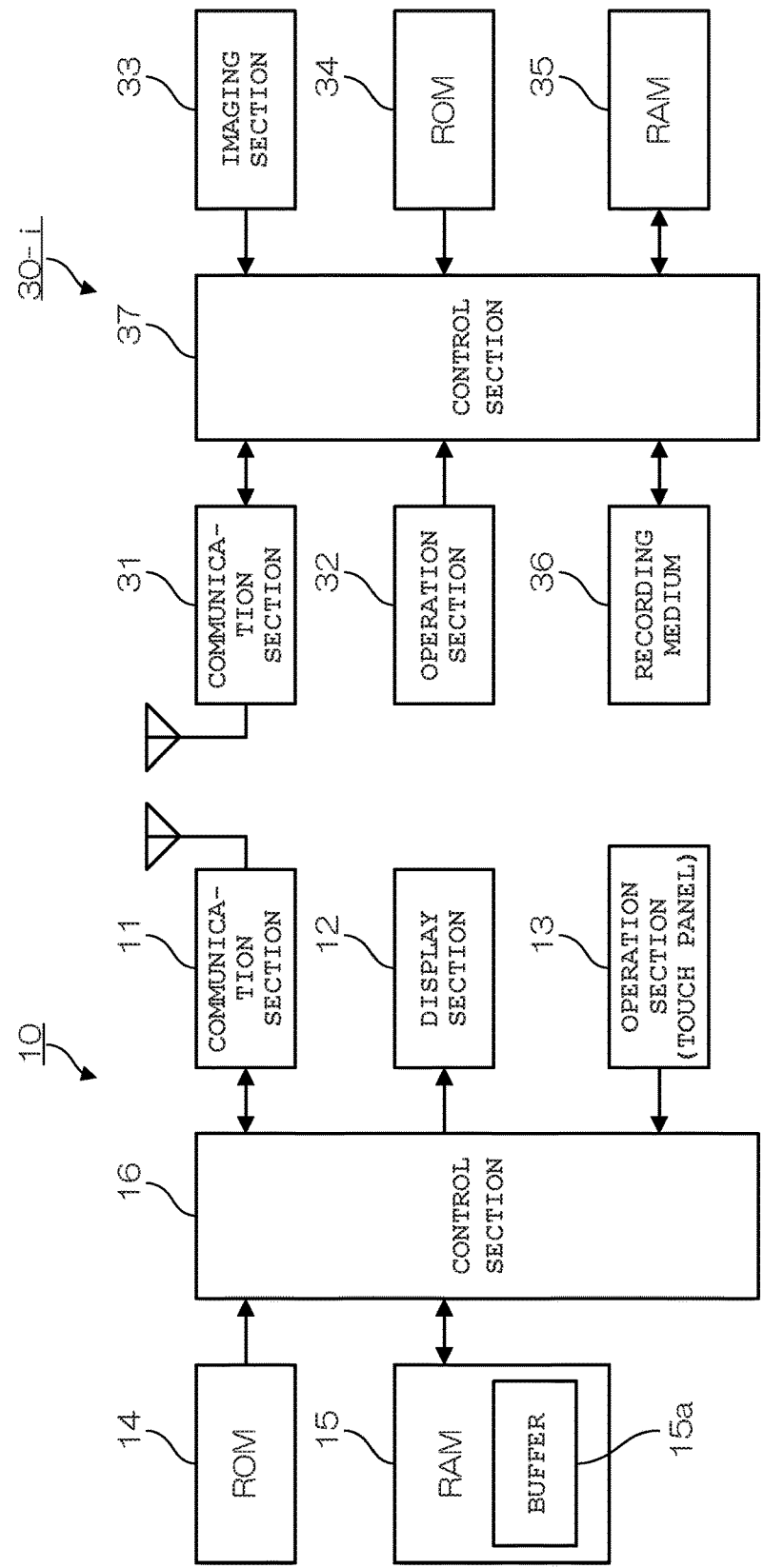
FIG. 2A is a block diagram of the structure of the receiver 10 according to the present embodiment.
FIG. 2B is a block diagram of the structure of a digital camera 30-i according to the present embodiment.

FIG. 2A is a block diagram of the structure of the receiver 10 according to the present embodiment, and FIG. 2B is a block diagram of the structure of a digital camera 30-*i* (i=1 to 7) according to the present embodiment. The receiver 10 in FIG. 2A includes a communication section (Bluetooth (registered trademark)) 11, a display section 12, an operation section (touch panel) 13, a ROM (Read Only Memory) 14, a RAM (Random Access Memory) 15, and a control section 16. The communication section 11 uses Bluetooth (registered trademark) to transmit and receive various commands, thumbnail data, image data, and the like to and from the digital camera 30-1.

The display section 12 is constituted by a liquid-crystal display, organic EL (Electro Luminescence) display, or the like, and displays icons linked to specific functions, applications, or the like, application screens, various menu screens, and the like. The operation section (touch panel) 13 detects a direct contact or proximity of a finger, stylus (pen), or the like. This operation section (touch panel) 13 may include mechanical switches such as a power supply button and a sound volume button.

The ROM 14 has stored therein programs to be executed by the control section 16 described below, various parameters required for operation, and the like. The RAM 15 stores, for example, temporary data when the control section 16 described below executes a program, various application programs, various parameters required for performing the applications, and image data received from the plurality of digital cameras 30-1 to 30-*n*. In particular, in the descriptions below, an area allocated in the RAM 15 to store image data is referred to as a buffer 15*a*.

The control section 16 executes a program stored in the above-described ROM 14 to control the operation of each section. In particular, in the present embodiment, the control section 16 sets a storage capacity to be assigned for each connected digital camera in accordance with the number of the connected digital cameras 30-1 to 30-*n*, and allocates the storage capacities in the buffer 15*a*. Also, the control section 16 requests each of the connected digital cameras 30-1 to 30-*n* to transmit image data for one frame, receives the image data transmitted from the digital cameras 30-1 to 30-*n* in response to the requests, and stores the image data in each area of the buffer 15*a* allocated for each digital camera. Also, after receiving the image data for one frame from all of the connected digital cameras 30-1 to 30-*n*, the control section 16 generates, from each image data, a display image for list display on one screen of the display section 12, and displays these display images on the display section 12 as live view images.

The digital camera 30-*i* (i=1 to 7) in FIG. 2B includes a communication section 31, an operation section 32, an imaging section 33, a ROM 34, a RAM 35, a recording medium 36, and a control section 37. The communication section 31 uses Bluetooth (registered trademark) to transmit image data to the receiver 10 and to transmit and receive various commands and the like to and from the receiver 10.

The operation section 32 includes a plurality of operation keys such as a power supply switch, a shutter switch, a zoom switch, a mode key, a SET key, and a cross key, and outputs an operation signal in accordance with the user's key operation.

The imaging section 33 includes a lens block formed of an optical lens group and an image sensor such as a CCD (Charge Coupled Device) or a CMOS (Complementary Metal Oxide Semiconductor), and converts an image entering from the lens block into a digital signal by the image sensor for output.

The ROM 34 has stored therein programs to be executed by the control section 37 described below, various parameters required for operation, and the like. The RAM 35 is used as a buffer memory for temporarily storing image files captured by the imaging section 33, and is also used as a working memory for the control section 37. The recording medium 36 stores the captured image files and the like.

The control section 37 executes a program stored in the above-described ROM 34 to control the operation of each section. In particular, in the present embodiment, the control section 37 transmits image data in response to a request every time a request for image data is received from the receiver 10.

In the present embodiment, the digital camera 30-*i* does not include a display section. However, as a general digital camera, the digital camera 30-*i* may include a display section constituted by a liquid-crystal display, an organic EL (Electro Luminescence) display, or the like.

FIG. 3 is a conceptual diagram of processable frame rates and throughputs with respect to the number of buffer stages to be assigned for each digital camera 30-*i*. As shown in FIG. 3, in the receiver 10, a processable frame rate (fps) and a processable throughput (bps) vary depending on the number of stages to be assigned for each digital camera 30-*i*. That is, in a case where the number of stages to be assigned for each digital camera 30-*i* is one, the processable frame rate is 6 fps and the processable throughput is 610 kbps.

Similarly, the processable frame rate is 10 fps and the processable throughput is 1040 kbps when the number of stages to be assigned for each digital camera 30-*i* is two; the processable frame rate is 13 fps and the processable throughput is 1400 kbps when the number of these stages is three; and the processable frame rate is 15 fps and the processable throughput is 1500 kbps when the number of these stages is four or more.

That is, if a storage capacity for at least four stages can be assigned to the buffer 15*a* for each digital camera 30-*i*, an intended frame rate and an intended throughput can be acquired. However, when the number of the stages per camera is fixed, and seven digital cameras 30-1 to 30-7 are connected, four stages×seven cameras are present, which constrains the memory (RAM 15). Here, when the number of the digital cameras is less than seven, an unused area is present, which degrades the use efficiency of the memory. Thus, in the present embodiment, the buffer 15*a* having a storage area for ten stages is prepared, and the upper limit of the number of stages to be assigned per camera is set at four stages. Then, the number of stages (storage capacity) to be assigned per camera is dynamically changed based on the number of connected digital cameras 30-1 to 30-*n*.

FIG. 4 is a conceptual diagram of the number of stages (per camera) to be allocated in accordance with the number of cameras connected to the receiver 10 according to the present embodiment. In the present embodiment, when the number of connected digital cameras 30 is one or two, a storage capacity for four stages is assigned to the buffer 15*a* for each camera. When the number of connected digital cameras 30 is three, a storage capacity for three stages is assigned to the buffer 15*a* for each camera. When the number of connected digital cameras 30 is four or five, a storage capacity for two stages is assigned to the buffer 15*a* for each camera. When the number of connected digital cameras 30 is six or seven, a storage capacity for one stage is assigned to the buffer 15*a* for each camera. Note that, in any of these cases, the total number of stages does not exceed ten stages.

As such, by the configuration where a storage capacity to be assigned per camera can be dynamically changed in accordance with the number of connected digital cameras 30-1 to 30-*n*, an intended throughput can be ensured and a multi-live view can be achieved without constraining the capacity of the memory even when the number of connected cameras is changed. Note that, although the frame rate and the throughput are both decreased when three or more cameras are connected, they are, for practical use, not decreased so much that their decrease is recognizable by the user. Optionally, when three or more cameras are connected, the sizes of images to be transferred may be decreased to reduce effects on the frame rate.

B. Operation of Embodiment

Next, the operation of the above-described embodiment is described.

Figure 5:
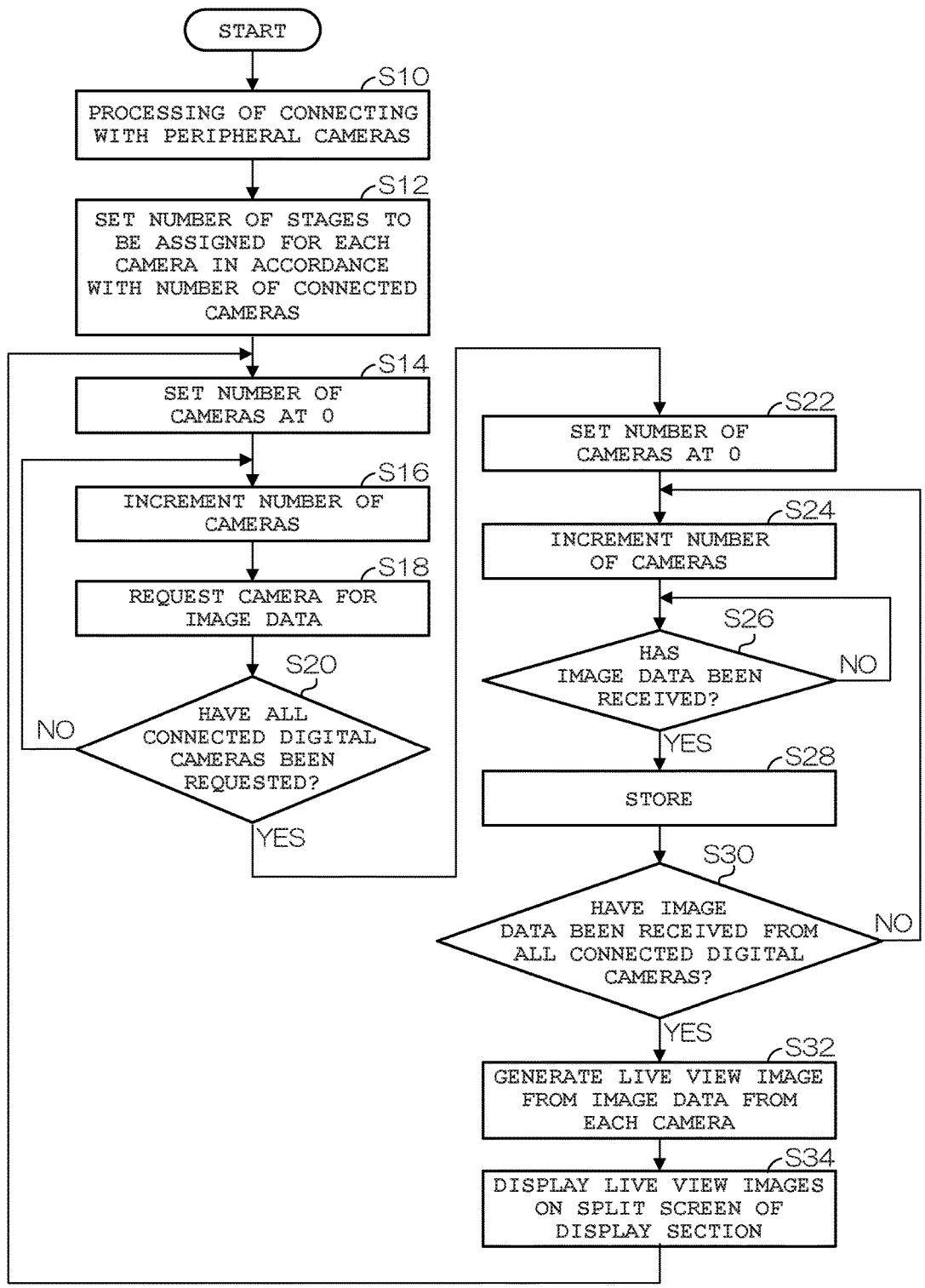
FIG. 5 is a flowchart for describing the operation of the receiver 10 according to the present embodiment.

FIG. 5 is a flowchart for describing the operation of the receiver 10 according to the above-described embodiment. In the receiver 10, the control section 16 performs processing of connecting with peripheral digital cameras via the communication section 11 (Step S10). Note that the connection procedure by wireless communication (Bluetooth (registered trademark)) is a known technique and is therefore not described herein. Next, the control section 16 sets the number of stages (storage capacity) to be assigned for each digital camera 30-*i* in accordance with the number of the connected cameras (Step S12).

That is, when the number of the connected digital cameras is one or two, a storage capacity for four stages is assigned to the buffer 15*a* for each camera. When the number of the connected digital cameras is three, a storage capacity for three stages is assigned to the buffer 15*a* for each camera.

When the number of the connected digital cameras is four or five, a storage capacity for two stages is assigned to the buffer 15*a* for each camera. When the number of the connected digital cameras is six or seven, a storage capacity for one stage is assigned to the buffer 15*a* for each camera.

Next, the control section 16 sets variable "i" at 0, and thereby sets the number of digital cameras to which image data transmission requests are transmitted at 0 (Step S14). This variable i is a counter for counting digital cameras 30-*i* that serve as processing targets. Next, the control section 16 increments variable i, which corresponds to the number of digital cameras, by one (Step S16), and transmits a request signal for requesting the i-th digital camera 30-*i* to transfer image data (Step S18).

Next, the control section 16 judges whether variable i is equal to or larger than the number of the connections "n", that is, judges whether all the digital cameras 30-*i* have been requested (a request signal has been transmitted to all the digital cameras 30-1) (Step S20). When judged that not all the digital cameras 30-*i* have been requested (NO at Step S20), the control section 16 returns to Step S16. Thereafter, the control section 16 transmits a request signal for image data transmission to each connected digital camera 30-1 to 30-*n* while incrementing variable i by one.

Then, when judged that all the digital cameras 30-*i* have been requested (YES at Step S20), the control section 16 resets variable i at 0 so as to sequentially receive image data from the connected digital cameras 30-1 to 30-*n* (Step S22).

Next, the control section 16 increments variable i, which corresponds to the number of digital cameras, by one (Step S24), and judges whether image data has been received from the i-th digital camera 30-*i* (Step S26). When judged that no image data has been received therefrom (NO at Step S26), the control section 16 enters a wait state.

Conversely, when judged that image data has been received therefrom (YES at Step S26), the control section 16 stores the image data in a corresponding area in the buffer 15*a* (Step S28).

Next, the control section 16 judges whether image data have been received from all the digital cameras 30-*i* (Step S30). Then, when judged that there are digital cameras 30-*i* that have not transmitted image data (NO at Step S30), the control section 16 returns to Step S26. Thereafter, the control section 16 receives image data from all the digital cameras 30-1 to 30-*n* while incrementing variable i by one every time it receives image data, and stores each image data in a corresponding area in the buffer 15*a*.

Then, when judged that image data have been received from all the digital cameras 30-*i* (YES at Step S30), the control section 16 generates a live view image for each image data received from the digital cameras 30-1 to 30-*n* (Step S32), and displays the live view images generated from the image data received from the digital cameras 30-1 to 30-*n*, on one screen of the display section 12 (Step S34).

The above-described processing is processing for a through image for one frame. Subsequently, the control section 16 returns to Step S14 to repeat the processing for the next frame. Thereafter, the control section 16 repeats the processing from Step S14 to Step S32 described above unless the multi-live view processing is ended by a certain event. As a result, a list where live view images from the connected digital cameras 30-1 to 30-n are arranged in a tile form is displayed.

Figure 6:
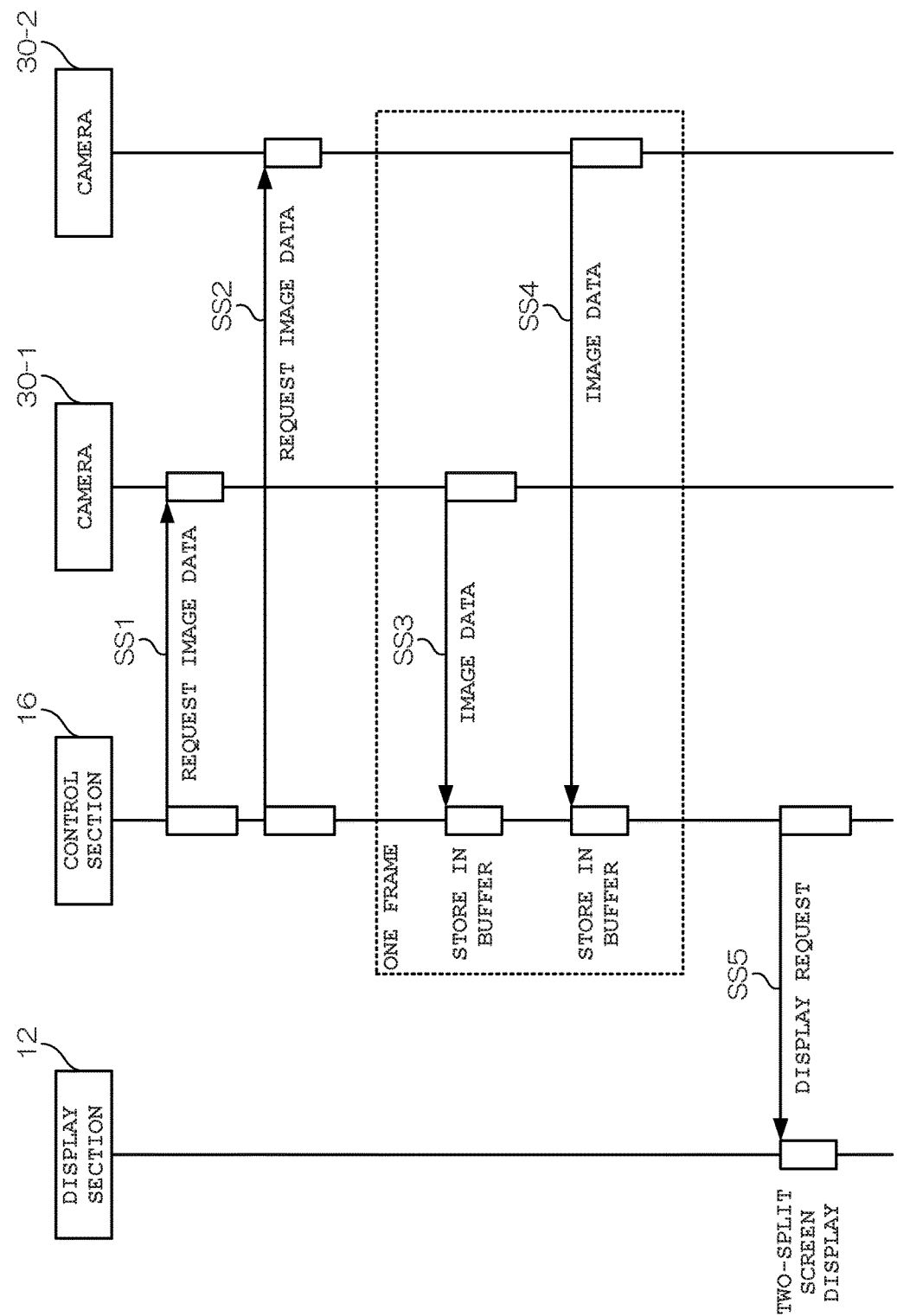
FIG. 6 is a sequence diagram for describing the operation of the imaging system 1 according to the present embodiment.

FIG. 6 is a sequence diagram for describing the operation of the imaging system 1 according to the present embodiment. In FIG. 6, the operation of the imaging system 1 when two digital cameras 30-1 and 30-2 are connected to the receiver 10 is shown. That is, a storage capacity for four stages is assigned to the buffer 15a for each of the digital cameras 30-1 and 30-2.

First, the control section 16 of the receiver 10 transmits an image data request signal to the digital camera 30-1 via the communication section 11 (Step SS1), and then transmits an image data request signal to the digital camera 30-2 (Step SS2).

Subsequently, in response to the received request signal, the digital camera 30-1 transfers image data for one frame to the receiver 10 (Step SS3). Also, in response to the received request signal, the digital camera 30-2 transfers image data for one frame to the receiver 10 (Step SS4).

Next, the control section 16 of the receiver 10 receives the image data for one frame transferred from the digital camera 30-1, and stores it in a corresponding area in the buffer 15a.

Subsequently, the control section 16 receives the image data for one frame transferred from the digital camera 30-2, and stores it in a corresponding area in the buffer 15a.

Then, the control section 16 of the receiver 10 generates live view images from the image data received from the digital cameras 30-1 and 30-2, and sends a display request to the display section 12 (in practice, a display control section which controls the display section 12) (Step SS5). On the display section 12, each live view image is displayed in each split area acquired by one screen being split into two.

The above-described processing is processing for one frame, as in the case of the flowchart of FIG. 5. By the above-described sequence being repeated, live view images from the connected digital cameras 30-1 and 30-2 are displayed in a tile form on the display section 12 of the receiver 10. In this case, since a storage capacity for four stages has been assigned for each of the digital cameras 30-1 and 30-2, the images are displayed at a frame rate of 15 fps and a throughput of 1500 kbps.

In FIG. 6 described above, image data are received from two digital cameras 30-1 and 30-2 and live view images based on the image data are displayed on a split screen of the display section 12. However, the number of digital cameras therein may be three or more. Also, for example, when the display section 12 has an image resolution of VGA (Video Graphics Array)(640×480 pixels), the control section 16 requests two digital cameras 30-1 and 30-2 to transmit image data of QVGA (Quarter Video Graphics Array) (320×240 pixels). This request is not changed until the number of the simultaneously-connected digital cameras is increased to four.

When the number of the digital cameras is further increased to five or more, the control section 16 requests the digital cameras to transmit image data of QQVGA (Quarter Quarter Video Graphics Array) (160×120 pixels).

As such, when the number of the simultaneously-connected digital cameras is larger, the control section 16 sets such that the resolution of image data to be requested for transmission is lower, whereby smooth multi-live view is achieved.

Also, in the present embodiment, the display of live view images has been described. However, images in this split-display state may be taken as a frame and stored in a predetermined storage area in the RAM 15 as a moving image file, or may be stored as a captured image (still image file).

In the above-described embodiment, image data continually transmitted from the plurality of digital cameras 30-1 to 30-n are received by the communication section 11 of the receiver 10, and these continually received image data are individually stored in areas of the buffer 15a having storage capacities assigned based on the number of the plurality of digital cameras 30-1 to 30-n. As a result of this configuration, images transmitted from the plurality of digital cameras 30-1 to 30-n can be displayed without affecting buffering processing.

Also, in the above-described embodiment, image data received from the plurality of digital cameras 30-1 to 30-n and stored in the buffer 15a are read out and controlled to be displayed on a screen of the display section 12 split in accordance with the number of the plurality of digital cameras 30-1 to 30-n. As a result of this configuration, images transmitted from the plurality of digital cameras 30-1 to 30-n can be displayed without affecting buffering processing.

Moreover, in the above-described embodiment, a storage capacity to be assigned for each of the plurality of digital cameras 30-1 to 30-n is set based on the number of the plurality of connected digital cameras 30-1 to 30-n, and image data received therefrom are stored in areas having the set storage capacities. As a result of this configuration, images transmitted from the plurality of digital cameras 30-1 to 30-n can be displayed without constraining the capacity of the entire memory or affecting buffering processing.

Furthermore, in the above-described embodiment, image data are transmitted and received every time the plurality of digital cameras 30-1 to 30-n capture new images, and each image data is individually overwritten for update when new image data are received. As a result of this configuration, images transmitted from the plurality of digital cameras 30-1 to 30-n can be displayed without affecting buffering processing.

Still further, in the above-described embodiment, image data received from the plurality of digital cameras 30-1 to 30-n and stored in the buffer 15a are displayed all at once at timing independent from the update timing of each image data stored in the buffer 15a. As a result of this configuration, images transmitted from the plurality of digital cameras 30-1 30-n can be displayed without affecting buffering processing.

While the present invention has been described with reference to the preferred embodiments, it is intended that the invention be not limited by any of the details of the description therein but includes all the embodiments which fall within the scope of the appended claims.

What is claimed is:

1. An electronic device comprising:
   a communication section which communicates with a plurality of image transmitting devices;
   a reception section which receives image data transmitted from the plurality of image transmitting devices by the communication section;
   a storage section;
   a setting section which sets respective areas for the plurality of image transmitting devices in the storage section;
   a storage control section which controls the storage section such that the image data from the plurality of image transmitting devices are assigned to and stored in the respective areas set by the setting section;

display section; and a display control section which performs control such that the image data transmitted from the plurality of image transmitting devices and stored in the storage section are read out and displayed on a screen of the display section, which is split in accordance with a number of the plurality of image transmitting devices, wherein the reception section receives transmitted image data every time new images are acquired by the plurality of image transmitting devices, wherein the storage control section controls the storage section such that each image data is individually overwritten to perform updating when new image data are received, and wherein the display control section performs control such that the image data received from the plurality of image transmitting devices and stored in the storage section are displayed all at once at a timing independent from an update timing of each image data by the storage control section.

2. The electronic device according to claim 1, wherein the setting section further sets storage capacities to be assigned to the storage section based on the number of the plurality of image transmitting devices, and wherein the storage control section performs control such that the image data received by the reception section are stored in areas having the set storage capacities.

3. An image data processing method comprising:

establishing communication with a plurality of image transmitting devices;

receiving image data transmitted from the plurality of image transmitting devices;

setting respective areas for the plurality of image transmitting devices, in a memory;

controlling storage in the memory such that the image data from the plurality of image transmitting devices are assigned to and stored in the set respective areas;

performing display control such that the image data transmitted from the plurality of image transmitting devices and stored in the memory are read out and displayed on a screen of a display, which is split in accordance with a number of the plurality of image transmitting devices, wherein the transmitted image data is received every time new images are acquired by the plurality of image transmitting devices, wherein the storage in the memory is controlled such that each image data is individually overwritten to perform updating when new image data are received, and wherein the display control is performed such that the image data received from the plurality of image transmitting devices and stored in the memory are displayed on the screen of the display all at once at a timing independent from an update timing of each image data.

4. The image data processing method according to claim 3, further comprising setting storage capacities to be assigned to the memory based on the number of the plurality of image transmitting devices, and wherein the received image data are stored in areas having the set storage capacities in the memory.

5. A non-transitory computer-readable storage medium having a program stored thereon that is executable by a computer in an electronic device having a communication section and a storage section to perform functions comprising:

reception processing for receiving image data transmitted from a plurality of external image transmitting devices via communication by the communication section;

setting processing for setting respective areas for the plurality of external image transmitting devices in the storage section;

storage control processing for controlling the storage section such that the image data from the plurality of external image transmitting devices are assigned to and stored in the respective areas set by the setting processing; and display control processing for performing control such that the image data transmitted from the plurality of external image transmitting devices and stored in the storage section are read out and displayed on a screen of a display section, which is split in accordance with a number of the plurality of external image transmitting devices, wherein the reception processing receives transmitted image data every time new images are acquired by the plurality of external image transmitting devices, wherein the storage control processing controls the storage section such that each image data is individually overwritten to perform updating when new image data are received, and wherein the display control processing performs control such that the image data received from the plurality of external image transmitting devices and stored in the storage section are displayed on a display section all at once at a timing independent from an update timing of each image data by the storage control processing.

6. The recording medium according to claim 5, wherein the setting processing further sets storage capacities to be assigned to the storage section based on the number of the plurality of external image transmitting devices, and wherein the storage control processing performs control such that the image data received by the reception processing are stored in areas having the set storage capacities.

7. An imaging system comprising;

a plurality of image transmitting devices, and an electronic device, wherein the electronic device comprises:

a communication section which communicates with the plurality of image transmitting devices, a reception section which receives image data transmitted from the plurality of image transmitting devices by the communication section, a storage section, a setting section which sets respective areas for the plurality of image transmitting devices in the storage section, a storage control section which controls the storage section such that the image data from the plurality of image transmitting devices are assigned to and stored in each of the respective areas set by the setting section, display section, and a display control section which performs control such that the image data transmitted from the plurality of image transmitting devices and stored in the storage section are read out and displayed on a screen of the display section, which is split in accordance with a number of the plurality of image transmitting devices, wherein the reception section receives transmitted image data every time new images are acquired by the plurality of image transmitting devices, wherein the storage control section controls the storage section such that each image data is individually overwritten to perform updating when new image data are received, and wherein the display control section performs control such that the image data received from the plurality of image transmitting devices and stored in the storage section are displayed all at once at a timing independent from an update timing of each image data by the storage control section, and wherein each of the plurality of image transmitting devices comprises:
an image acquisition section, and
a transmission section which continually transmits image data acquired by the image acquisition section to the electronic device.

* * * * *